(12) United States Patent
Bennett et al.

(10) Patent No.: US 6,612,390 B2
(45) Date of Patent: Sep. 2, 2003

(54) STEER KNUCKLE WITH INTEGRATED CAM SUPPORT

(75) Inventors: John L. Bennett, Fraser, MI (US); Robert J. Martin, Newark, OH (US)

(73) Assignee: Meritor Heavy Vehicle Technology, LLC., Troy, MI (US)

( * ) Notice: Subject to any disclaimer, the term of this patent is extended or adjusted under 35 U.S.C. 154(b) by 84 days.

(21) Appl. No.: 09/757,042

(22) Filed: Jan. 9, 2001

(65) Prior Publication Data

US 2002/0089141 A1 Jul. 11, 2002

(51) Int. Cl.[7] .................... B62D 7/18; F16D 51/22
(52) U.S. Cl. ................ 180/254; 280/93.512; 188/329; 188/330
(58) Field of Search .................. 280/93.512; 180/253, 180/254, 255, 258; 188/329, 330, 332, 338, 339

(56) References Cited

U.S. PATENT DOCUMENTS

| | | | | |
|---|---|---|---|---|
| 4,337,851 A | * | 7/1982 | Pringle | 188/330 |
| 4,452,347 A | * | 6/1984 | Dozier | 188/330 |
| 5,340,137 A | * | 8/1994 | Carraro et al. | 280/93.512 |
| 5,624,011 A | * | 4/1997 | White et al. | 280/93.512 |
| 5,649,612 A | * | 7/1997 | Walker et al. | 188/329 |

FOREIGN PATENT DOCUMENTS

JP  63-97455  * 4/1988

* cited by examiner

*Primary Examiner*—Peter C. English
(74) *Attorney, Agent, or Firm*—Carlson, Gaskey & Olds

(57) ABSTRACT

A steer axle for a heavy duty vehicle is provided including an axle assembly having an axle housing. A steer knuckle is connected to an end portion of the axle housing by king pins. The steer knuckle rotates relative to the axle housing about the king pins. A wheel end assembly including a brake drum and a pair of brake shoes is supported on an outer wall of the steer knuckle. Preferably, one end of a cam shaft is supported by the wheel end assembly, such as by a spindle. According to the present invention, the steer knuckle includes a boss extending from a portion of the steer knuckle. The boss includes a hole, and preferably, a bushing is received in the hole to support the other end of the cam shaft. Other brake components such as an air chamber, rod, and a brake adjuster are supported by the knuckle and connected to the cam shaft to rotate the cam shaft about its axis and force the brake shoes away from one another with a cam and into engagement with the brake drum.

17 Claims, 3 Drawing Sheets

STEER KNUCKLE WITH INTEGRATED CAM SUPPORT

BACKGROUND OF THE INVENTION

This invention relates to a steer knuckle for a heavy duty vehicle, and more particularly, the invention relates to a steer knuckle suitable for a front drive steer axle having drum brakes.

Heavy duty vehicles commonly include multiple drive axle assemblies. The drive axle assemblies are steerable, or permit the wheel ends to rotate relative to an axle housing during a vehicle turn, to provide better maneuverability of the heavy duty vehicle. Furthermore, the axle assemblies typically incorporate brake drums for providing a robust braking design and suitable stoppability for a heavy duty vehicle. Steer knuckles are supported on either end of the axle assembly for rotation by king pins. A wheel end assembly is supported on the knuckles and houses the brake shoes. Brake components such as an air chamber, rod, brake adjuster, and brake cam must be supported on the steer knuckle to pivot with the steer knuckle and wheel end assembly. As a result, the location and packaging of the brake components relative to the axle housing often dictates the amount of rotation of the knuckle that is permitted relative to the axle housing, or the turn angle.

In the prior art, a multi-piece bracket is bolted on a portion of the steer knuckle to support a end of the cam shaft. The cam bracket typically includes a pair of stamped metal bracket portions that support a bearing and are fastened to one another by numerous bolts. The cam bracket is then fastened to he steer knuckle with several fasteners. The multi-piece cam bracket is costly because it includes many components and is rather bulky. As a result, for some steer axle designs, the cam bracket prevents the knuckle from steering or pivoting an acceptable amount, or having an sufficient turn angle. Therefore, what is needed is an improved cam support for supporting an end of the cam shaft to permit an acceptable turn angle.

SUMMARY OF THE INVENTION AND ADVANTAGES

The present invention provides a steer axle for a heavy duty vehicle including an axle assembly having an axle housing. A steer knuckle is connected to an end portion of the axle housing by king pins. The steer knuckle rotates relative to the axle housing about the king pins. A wheel end assembly including a brake drum and a pair of brake shoes is supported on an outer wall of the steer knuckle. Preferably, one end of a cam shaft is supported by the wheel end assembly, such as by a spindle. According to the present invention, the steer knuckle includes a boss extending from a portion of the steer knuckle. The boss has a hole, and preferably, a bushing is received in the hole to support the other end of the cam shaft. Other brake components such as an air chamber, rod, and a brake adjuster are supported by the knuckle and connected to the cam shaft to rotate the cam shaft about its axis and force the brake shoes away from one another with a cam and into engagement with the brake drum.

Accordingly, the above invention provides a steer knuckle for supporting an end of the cam shaft to provide a more compact design and provide a greater turn angle.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
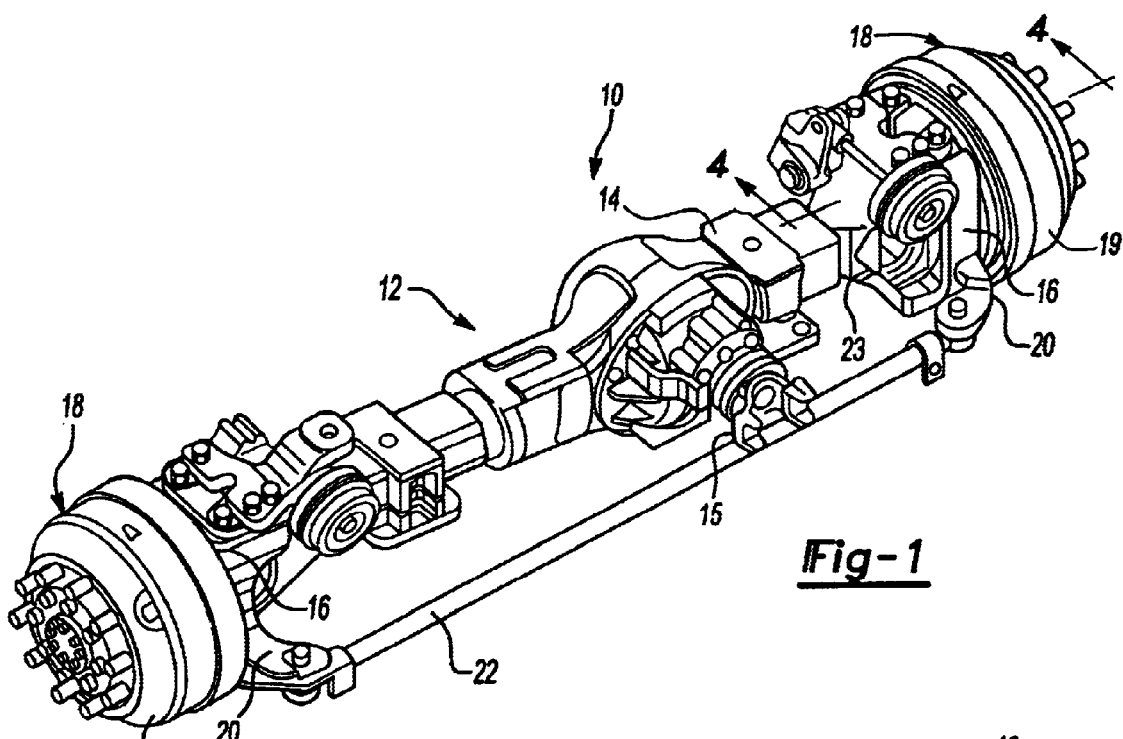
FIG. 1 is a perspective view of a steer axle of the present invention.
Figure 2:
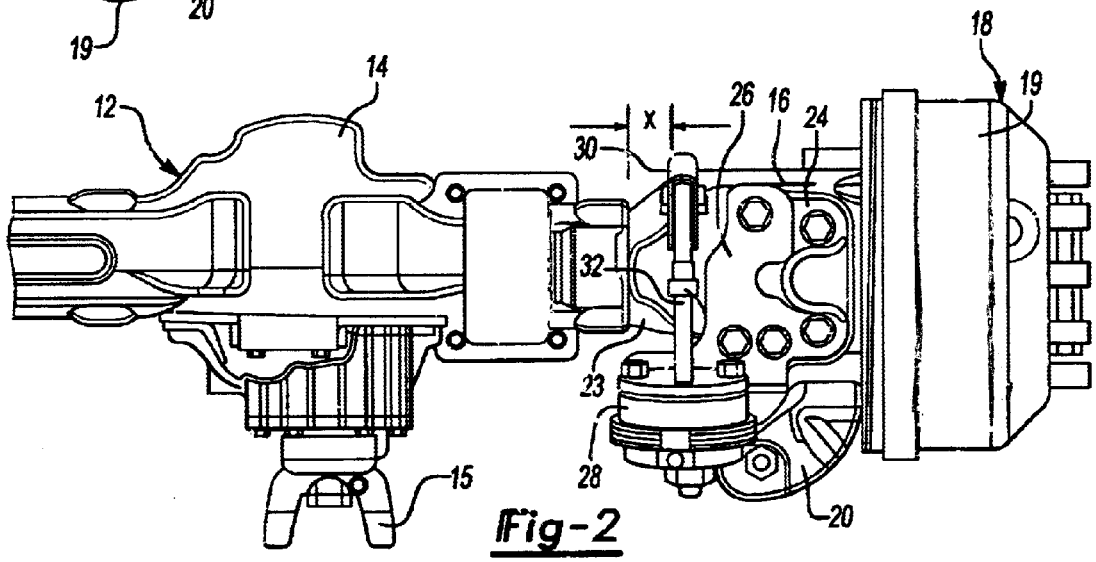
FIG. 2 is an enlarged top elevational view of the steer axle shown in FIG. 1.

A steer axle 10 including an axle assembly 12 are shown in FIG. 1. The axle assembly 12 includes an axle housing 14 having an input shaft 15 for providing rotational drive to the vehicle's wheels through driveshafts. Knuckles 16 are supported on either end of the axle housing 14 for supporting wheel end assemblies 18. Wheel end assemblies 18 include brake drums 19, which provide brake torque to the wheels when the brakes are actuated. Flanges 20 extend from the knuckles 16 and are interconnected by a steer linkage 22 so that the knuckles 16 and wheel end assemblies 18 rotate relative to the axle housing 14 in unison.

The axle housing 14 may include a housing end portion 23 received by the axle housing 14. The knuckles 16 are supported on the housing end portions 23 about which the knuckles 16 pivot about king pins 60 (see FIG. 4) are retained by a king pin cap 24 or other suitable means.

Figure 3:
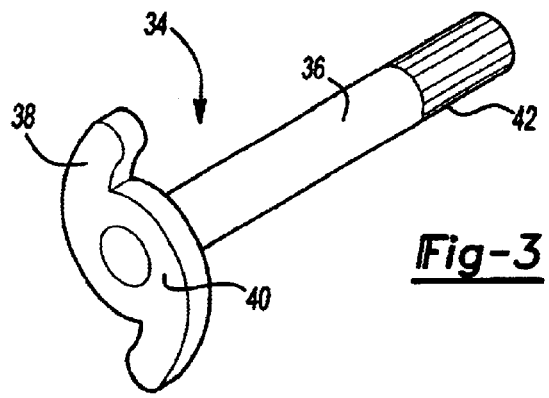
FIG. 3 is a perspective view of a brake cam.

The brake components supported on the knuckles 16 for rotation with the knuckles 16 and wheel end assembly 18. The brake components typically include a bracket 26 secured to the knuckles 16 for supporting a air chamber 28. A rod 32 is interconnected between an air chamber 28 and a slack adjusted 30. The air chamber 28 actuates the vehicle's brakes by moving the rod 32 and rotating the slack adjuster 30, which acts as a lever. The slack adjuster 30 compensates for wear in the bake shoes during the course of vehicle operation. The slack adjuster 30 is connected to a brake cam 34, shown in FIG. 3, which forces the brake shoes away from one another and into engagement with the brake drum 19 when the brake cam 34 is rotated about its axis by the air chamber 28. The brake cam 34 includes a cam shaft 36 and a cam 38 supported on an end portion 40. Another end portion 42 opposite the end portion 40 includes splines or knurling for securing the slack adjuster 30 thereto. In the prior art, the end portion 40 is commonly supported by a portion of the wheel end assembly 18 and the other end V portion 42 is supported by a multi-pieced cam bracket. However, it is to be understood that its not important how the end portion 40 is supported in the present invention.

Figure 4:
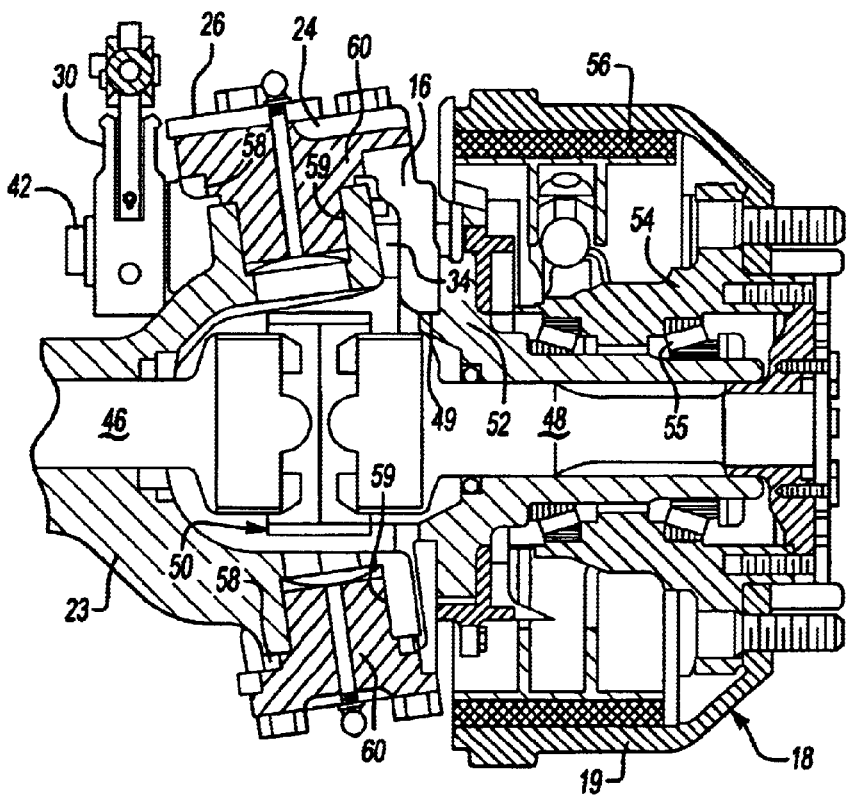
FIG. 4 is a cross-sectional view of a portion of the steer axle shown in FIG. 1.

Rotational drive is transmitted to the wheel end assemblies 18 by a plurality of drive shafts. Referring to FIG. 4, a main drive shaft 46 is supported by the housing end portion 23. A secondary drive shaft 48 extends through an opening 49 in the knuckle 16 and is coupled to the main drive shaft 46 by universal joint 50. A spindle 52 is secured to the knuckle 16 for supporting a spider 54 by bearings 55. Brake shoes 56 are housed within the wheel end assemblies 18 and engage the brake, drum 19 when the brake cam 34 is rotated about its axis by the air chamber 28. King pins 60 are secured to the knuckle 16 and received within bores 58 in the knuckle 16. The king pins 60 extend inward and are received by apertures 59 in the housing end portion 23 to permit the wheel end assemblies 18 to rotate relative to the axle housing 14.

Figure 5A:
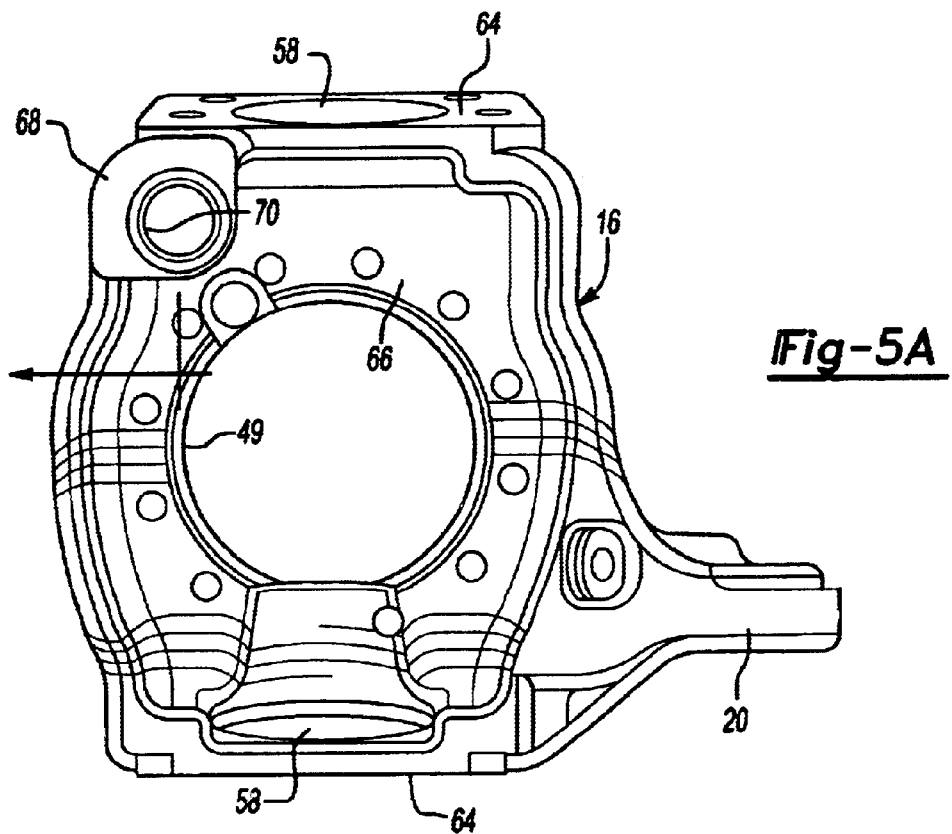
FIG. 5A is a end elevational view of the present invention steer knuckle.
Figure 5B:
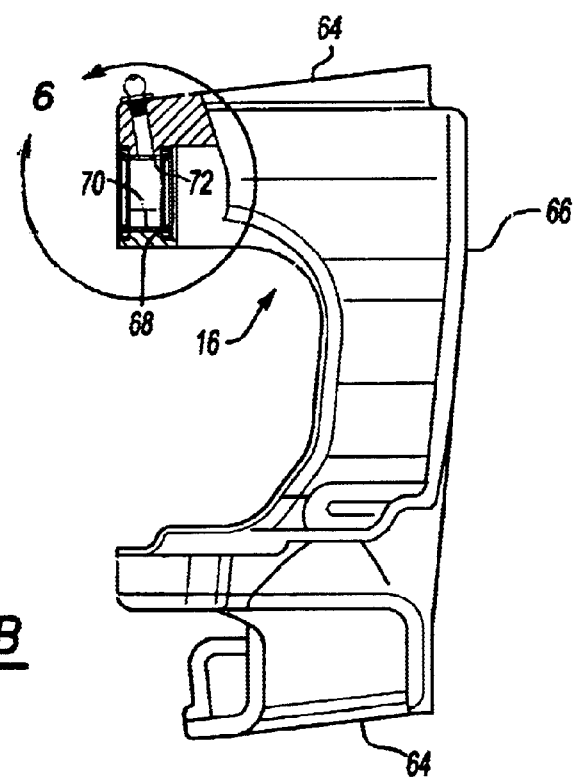
FIG. 5B is a side elevational view of the steer knuckle shown in FIG. 5A.

As shown in FIGS. 5A and 5B, the knuckles 16 include opposing walls 64 having opposing bores 58 for receiving the king pins 60. An outer wall 66 adjoins the opposing walls 64 and includes the opening 49 for permitting the secondary drive shaft 48 to extend therethrough. The spindle 52 is secured to the outer wall 66. Preferably, the end portion 40 of the brake cam 34 is supported by a portion of the wheel end assembly 18, such as the spindle 52.

Figure 6:
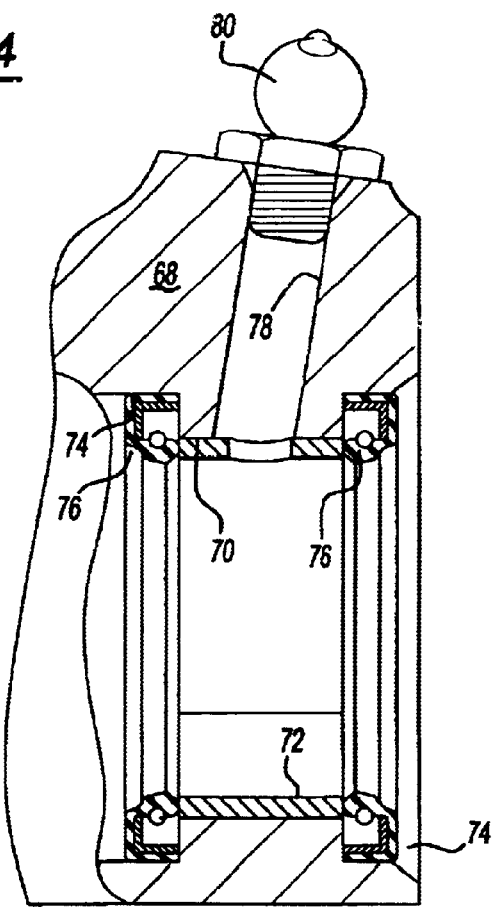
FIG. 6 is an enlarged partial cross-sectional view of the steer knuckle shown in FIG. 5B.

Often one of the brake components may interfere with the turning of the knuckle 16 relative to the axle housing 14. The steer axle 10 must include a clearance X between the axle housing 14 and the brake components and other components supported on the knuckle 16 so that an acceptable turning angle may be provided. In particular, the slack adjuster 30 must clear the axle housing 14 when the knuckle 16 pivots relative to the axle housing 14. The knuckles 16 include a boss 68 spaced from the outer wall 66 to support the other end portion 42 of the brake cam 34. The boss 68 includes a hole 70 preferably having a bushing 72 press fit therein, as shown in FIG. 6. The other end portion 42 of the brake cam 34 is supported by the bushing 72. The hole 70 may include spaced apart annular grooves 74 for receiving seals 76 to seal about the cam shaft 36. A lubrication passage 78 permits lubricating fluid to be introduced in the hole 70 to lubricate the cam shaft 36 within the bushing 72. A grease fitting 80, such as a zerk fitting, may be secured to an end of the lubrication passage 78.

In this manner, the multi-pieced cam bracket of the prior art may be eliminated, and a more compact design permitting increased turn angle may be provided.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A steer knuckle for a heavy duty vehicle comprising:
   opposing walls including bores for receiving opposing king pins;
   an outer wall adjoining said opposing walls and including an opening for receiving a drive shaft; and
   a boss supported on one of said opposing walls and spaced from said outer wall and including a hole with a bearing in said hole for supporting a brake cam shaft.

2. The steer knuckle according to claim 1, further including opposing king pins connecting said knuckle to an axle housing.

3. The steer knuckle according to claim 1, further including a cam shaft having an end portion supported by said bearing.

4. The steer knuckle according to claim 3, further including a wheel end assembly fastened to said outer wall.

5. The steer knuckle according to claim 4, wherein said cam shaft includes another end portion opposite said end portion, said another end portion supported by a portion of said wheel end assembly.

6. The steer knuckle according to claim 5, wherein said portion of said wheel end assembly is a spindle.

7. The steer knuckle according to claim 1, wherein said bearing is a bushing.

8. The steer knuckle according to claim 1, wherein said hole includes spaced annular grooves, each receiving a seal for sealing about the cam shaft.

9. The steer knuckle according to claim 8, further including a lubrication passage through said knuckle and intersecting said hole, and a grease fitting at an end of said lubrication passage opposite said hole.

10. A steer axle for a heavy duty vehicle comprising:
    an axle assembly having an axle housing;
    a steer knuckle including upper and lower portions connected to an end portion of said axle housing by king pins received in said upper and lower portions and defining a king pin axis;
    a wheel end assembly connected to said steer knuckle and including a spindle defining a spindle axis and extending from said steer knuckle between said upper and lower portions with said spindle axis at an obtuse angle relative to a portion of said king pin axis located above said spindle axis;
    a boss extending from said upper portion of said steer knuckle and including a hole through said boss; and
    a cam shaft including one end supported by said wheel end assembly and an opposing end extending through said hole and supported therein.

11. The steer axle according to claim 10, wherein said axle assembly includes a main drive haft supported in said axle housing and a secondary drive shaft extending through an opening in said steer knuckle and coupled to said main drive shaft by a universal joint.

12. The steer axle according to claim 10, further including a bearing in said hole supporting an end portion of said cam shaft.

13. The steer axle according to claim 12, wherein said bearing is a bushing.

14. The steer axle according to claim 10, wherein said hole includes spaced annular grooves, each receiving a seal for sealing about the cam shaft.

15. The steer axle according to claim 14, further including a lubrication passage through said knuckle and intersecting said hole, and a grease fitting at an end of said lubrication passage opposite said hole.

16. The steer axle according to claim 10, further including an air chamber supported on said knuckle, a lever supported on an end of said cam shaft, and a rod interconnecting said lever and said air chamber.

17. The steer axle according to claim 16, wherein said lever is a slack adjuster.

* * * * *

UNITED STATES PATENT AND TRADEMARK OFFICE
CERTIFICATE OF CORRECTION

PATENT NO.     : 6,612,390 B2
DATED          : September 2, 2003
INVENTOR(S)    : John L. Bennett and Robert J. Martin It is certified that error appears in the above-identified patent and that said Letters Patent is hereby corrected as shown below:

<u>Column 4,</u>
Line 38, "haft" should read -- shaft --

Signed and Sealed this

Fourteenth Day of October, 2003

JAMES E. ROGAN
*Director of the United States Patent and Trademark Office*